(12) United States Patent  
Yamamura et al.

(10) Patent No.: US 8,002,061 B2
(45) Date of Patent: Aug. 23, 2011

(54) ALL TERRAIN VEHICLE WITH IMPROVED AIR INTAKE

(75) Inventors: Takashi Yamamura, Shizuoka (JP); Satoshi Kubota, Shizuoka (JP); Yoshitaka Suzuki, Shizuoka (JP)

(73) Assignee: Yamaha Haysudoki Kabushiki Kaisha, Shizuoka (JP)

( * ) Notice: Subject to any disclaimer, the term of this patent is extended or adjusted under 35 U.S.C. 154(b) by 428 days.

(21) Appl. No.: 12/362,130

(22) Filed: Jan. 29, 2009

(65) Prior Publication Data

US 2010/0187032 A1    Jul. 29, 2010

(51) Int. Cl.
*B60K 11/06* (2006.01)

(52) U.S. Cl. .................................. 180/68.1

(58) Field of Classification Search ............ 180/68.1, 180/68.2
See application file for complete search history.

(56) References Cited

U.S. PATENT DOCUMENTS 5,086,858 A    2/1992  Mizuta
7,717,206 B2 *  5/2010  Tanaka et al. ............ 180/68.3

* cited by examiner

*Primary Examiner* — J. Allen Shriver, II
*Assistant Examiner* — Erez Gurari
(74) *Attorney, Agent, or Firm* — Keating & Bennett, LLP

(57) ABSTRACT

An all terrain vehicle contains a partition wall which partitions a passenger space and a hood which is arranged ahead of the partition wall. When viewed from the side of the vehicle, an air outlet of an exhaust passage is opened in an upper space located between the partition wall and the hood.

26 Claims, 9 Drawing Sheets

ALL TERRAIN VEHICLE WITH IMPROVED AIR INTAKE

BACKGROUND OF THE INVENTION

1. Field of the Invention

The present invention relates to an all terrain vehicle including an engine and a belt-type continuously variable transmission which varies rotating speeds of the engine to output power, having an improved air intake.

2. Description of Related Art

Generally, an all terrain vehicle with a mounted engine unit having an integrated engine and a belt-type continuously variable transmission includes a cooling unit which supplies cooling air into the continuously variable transmission to cool a belt. As disclosed in U.S. Pat. No. 5,086,858, an engine unit is mounted behind a seat, a cooling air intake port is formed in a front end portion of a transmission case containing the belt-type continuously variable transmission in the engine unit, and a cooling air outlet port is formed in a rear end portion. Air is supplied to the cooling air intake from an upper portion of a pillar frame arranged upright behind the seat, and cooling air is discharged from the cooling air outlet to the rear side of the vehicle.

In the prior art, the cooling air is directly discharged from the cooling air outlet of the transmission case to the rear side of the vehicle. For this reason, exhaust sounds from the outlet can unfortunately be easily transmitted to a passenger sitting on the seat as a harsh noise.

SUMMARY OF THE INVENTION

The present invention has been made in consideration of the prior art, and has as its object to provide an all terrain vehicle which can inhibit exhaust sound from being transmitted to a passenger when cooling air is discharged.

According to an aspect of the present invention, there is provided an all terrain vehicle including: a body frame; a pair of left and right wheels and at least one pair of left and right rear wheels which are supported by the body frame; a partition wall arranged behind the front wheel in a front/rear direction of the vehicle; a seat which is arranged behind the partition wall in the front/rear direction of the vehicle and on which a passenger sits; an engine which is arranged behind the partition wall in the front/rear direction of the vehicle and a belt-type continuously variable transmission which varies rotating speeds of the engine to output power, the engine and the belt-type continuously variable transmission being mounted on the body frame; a hood having at least a part located ahead of the partition wall in the front/rear direction of the vehicle, and located above the front wheel; a cooling air passage which supplies cooling air into the continuously variable transmission; and an exhaust passage which has an air outlet located ahead of at least a part of the partition wall and below the hood and discharges the cooling air from an inside of the continuously variable transmission.

According to the vehicle of the present invention, since an air outlet of an exhaust passage which discharges air which cools the belt-type continuously variable transmission is opened ahead of at least a part of the partition wall and below the hood, exhaust sound from the air outlet is insulated by the partition wall and the hood. Therefore, noise can be inhibited from being transmitted to a passenger.

DETAILED DESCRIPTION OF THE PREFERRED EMBODIMENT

Figure 1:
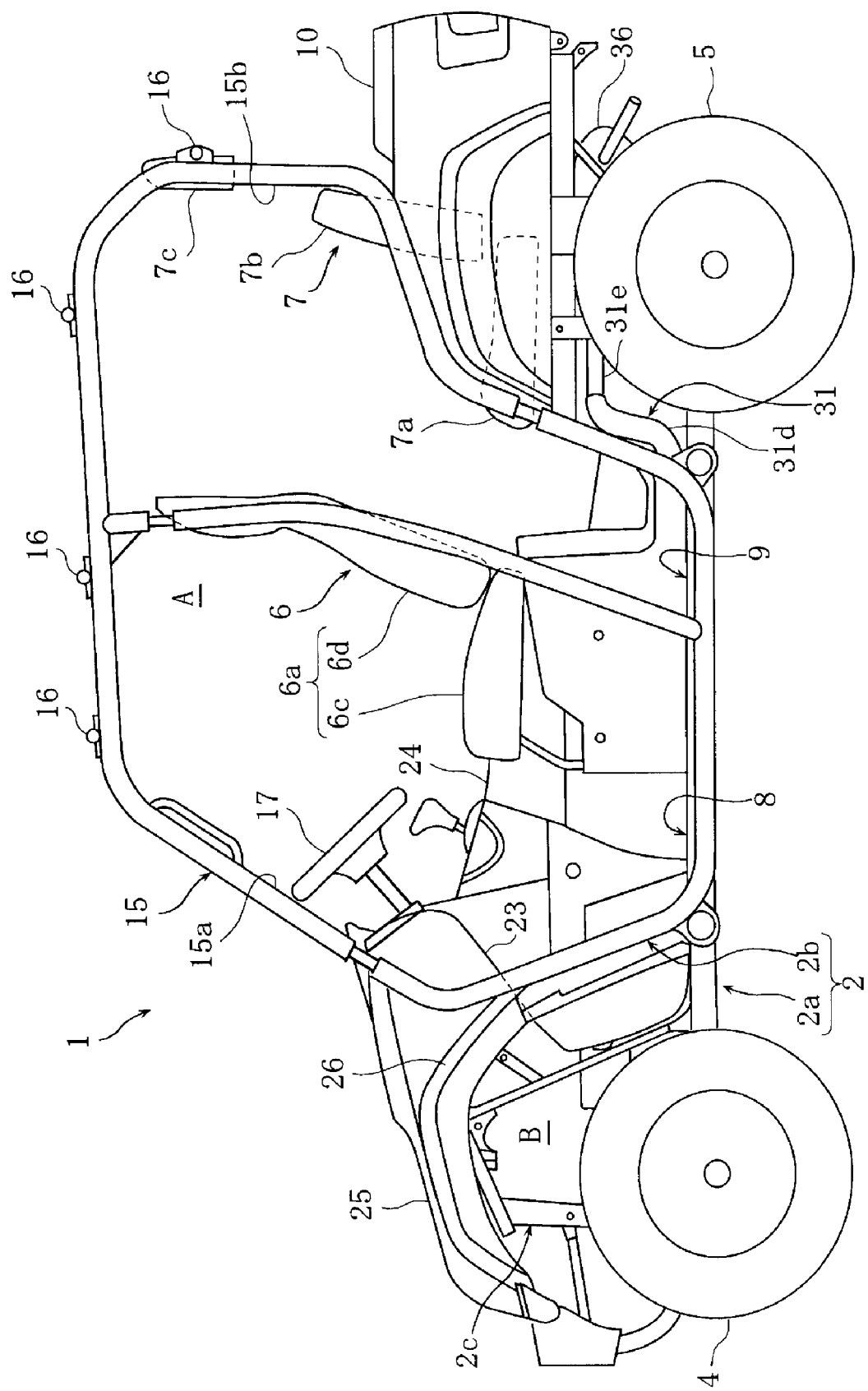
FIG. 1 is a side view of an all-terrain vehicle according to an embodiment of the present invention.
Figure 2:
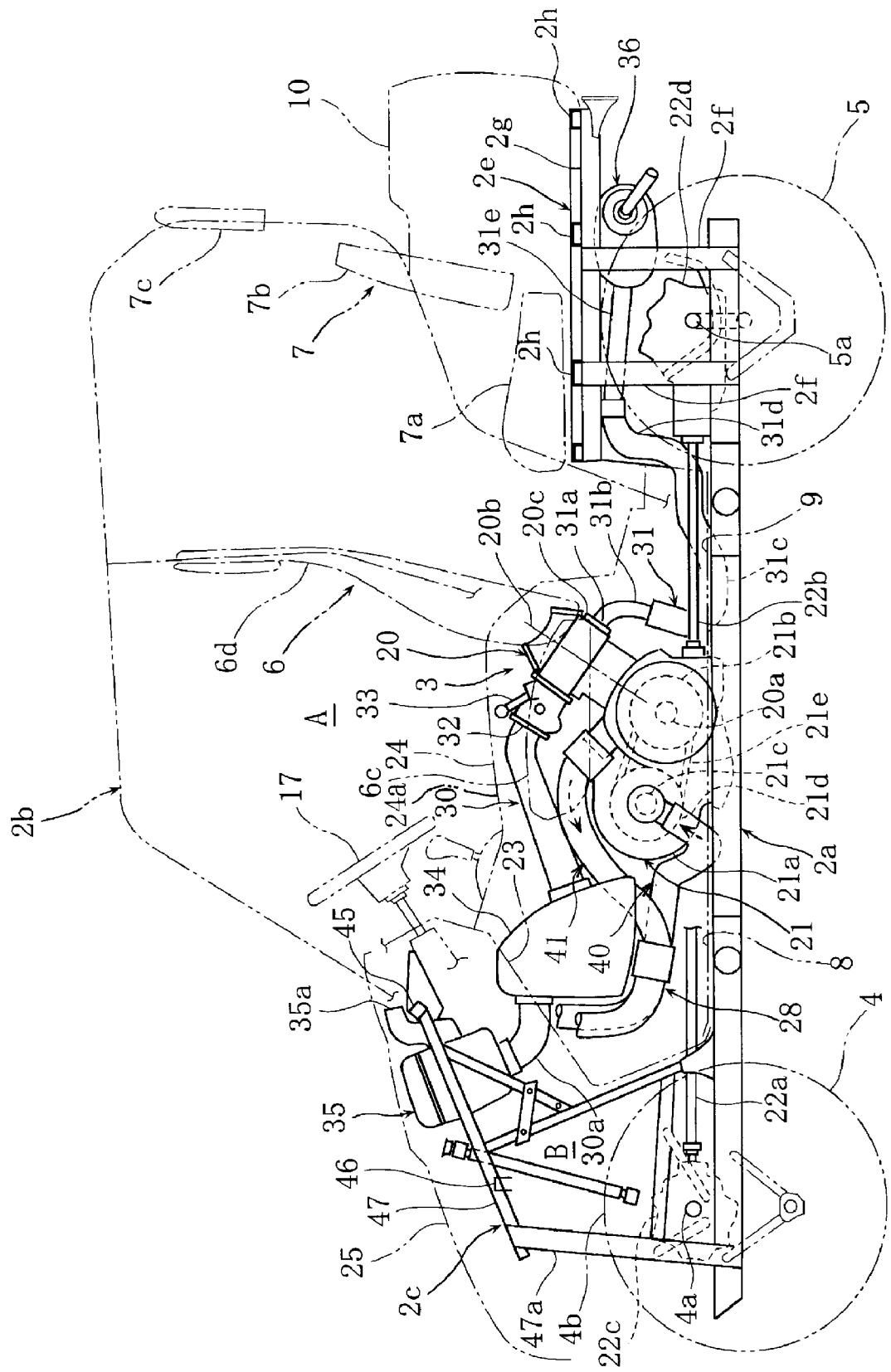
FIG. 2 is a side view of a body frame on which an engine unit of the vehicle is mounted.
Figure 3:
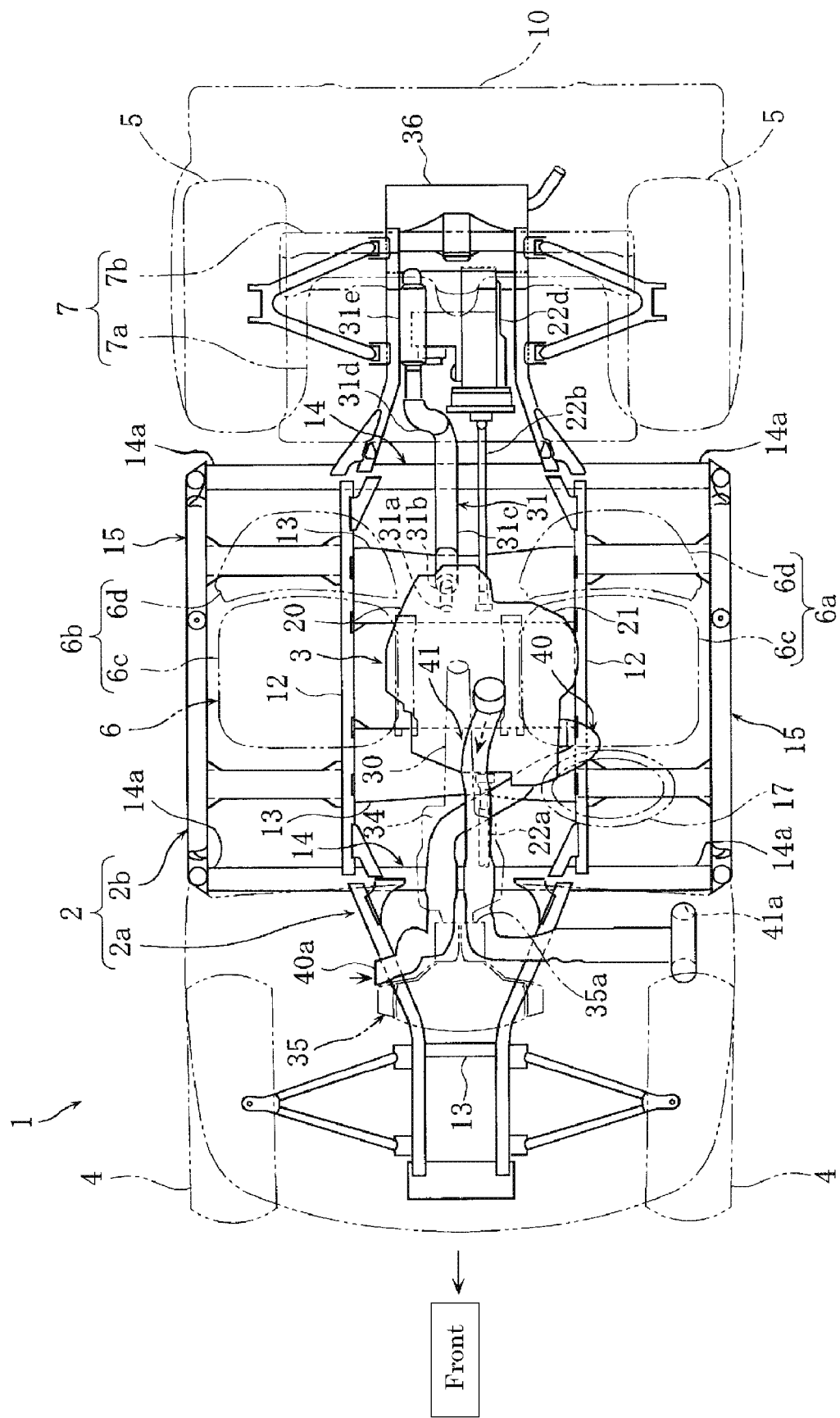
FIG. 3 is a plan view of the body frame.

An embodiment of the present invention will be described below with reference to the accompanying drawings.

FIGS. 1 to 9 are views to explain an all-terrain vehicle according to an embodiment of the present invention. In the embodiment, front, rear, ahead, behind, left, right, above, and below, unless otherwise noted, are from the perspective of a passenger sitting on a seat. Also, as shown in the Figures like parts are identified with the same numeral. The front wheels are the same on both the left and right sides, so they are referenced by like numeral 3. In some instances only the left side of the vehicle is shown, but it is understood that similar items on the right side, while not shown, are of similar nature.

In the drawings, reference numeral 1 denotes an all-terrain vehicle. The vehicle 1 includes a body frame 2, an engine unit 3 mounted on the body frame 2, front wheels 4 arranged at left and right front ends of the body frame 2, and rear wheels 5 arranged at left and right rear ends.

The body frame 2 includes a main frame 2a which extends in the front/rear direction of the vehicle to have a ladder-like shape and on which the left and right front wheels 4, the left and right rear wheels 5 and the engine unit 3 are arranged, left and right pillar frames 2b which are arranged upright on left and right outer ends of a front/rear center portion of the main frame 2a and which form a vehicle chamber (passenger space) A together with the main frame 2a, a front frame 2c which is arranged upright ahead of the vehicle chamber A to configure a front chamber B, and a loading space frame 2e arranged upright behind the vehicle chamber A.

The main frame 2a has left and right center members 12 extending in the front/rear direction of the vehicle and front and rear cross members 14 which connect front ends and rear ends of the left and right center members 12 to each other. Middle portions of the left and right center members 12 are connected to each other by planar center cross members 13. The engine unit 3 is mounted on the planar center cross members 13.

Outer ends of the front and rear cross members 14 in the front/rear direction of the vehicle are connected to the pillar frames 2b.

The pillar frames 2b have left and right pillar members 15 where front and rear entrances 15a and 15b are formed, and a plurality of roof members 16 which connect upper sides of the left and right pillar members 15 to each other.

Figure 6:
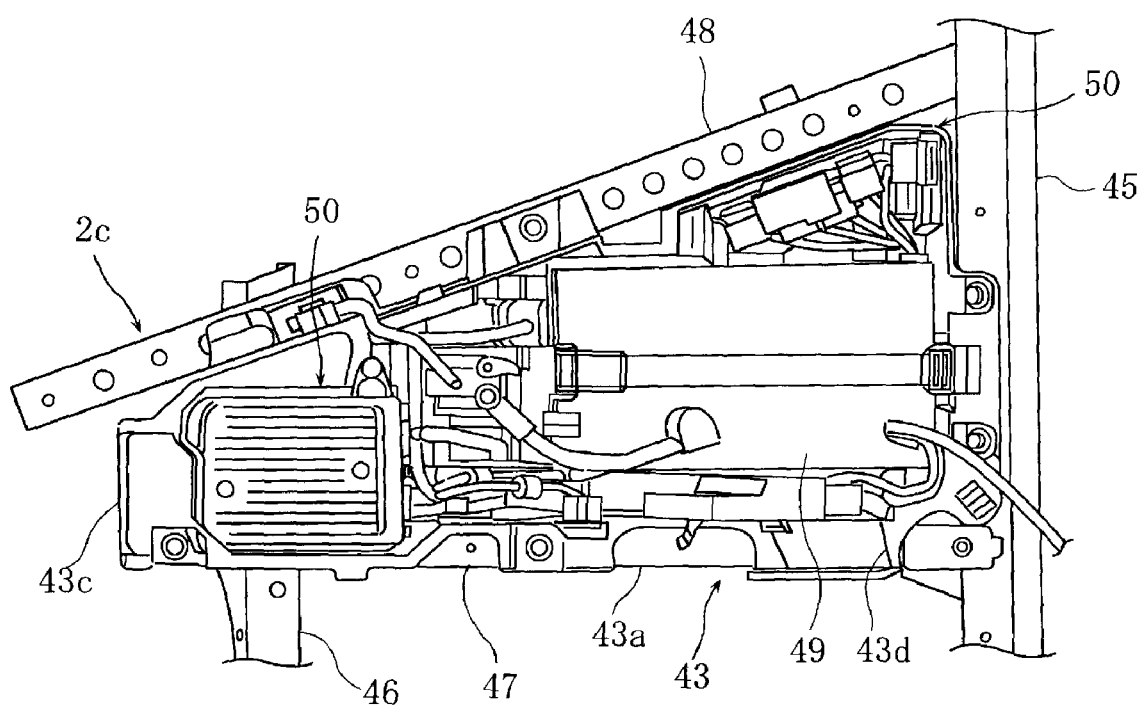
FIG. 6 is a plan view of a housing box mounted on the body frame.
Figure 8:
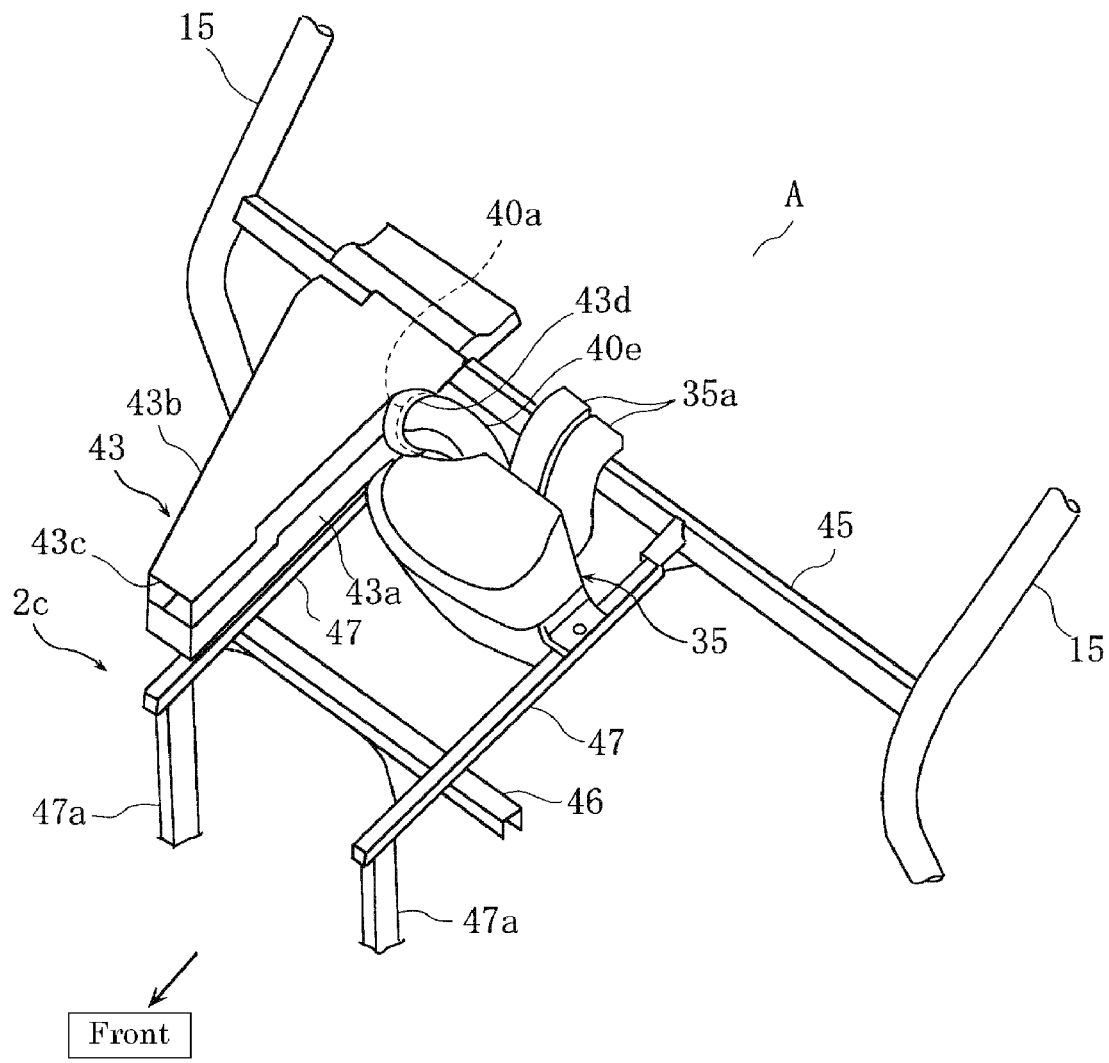
FIG. 8 is a perspective view of the housing box.
Figure 9:
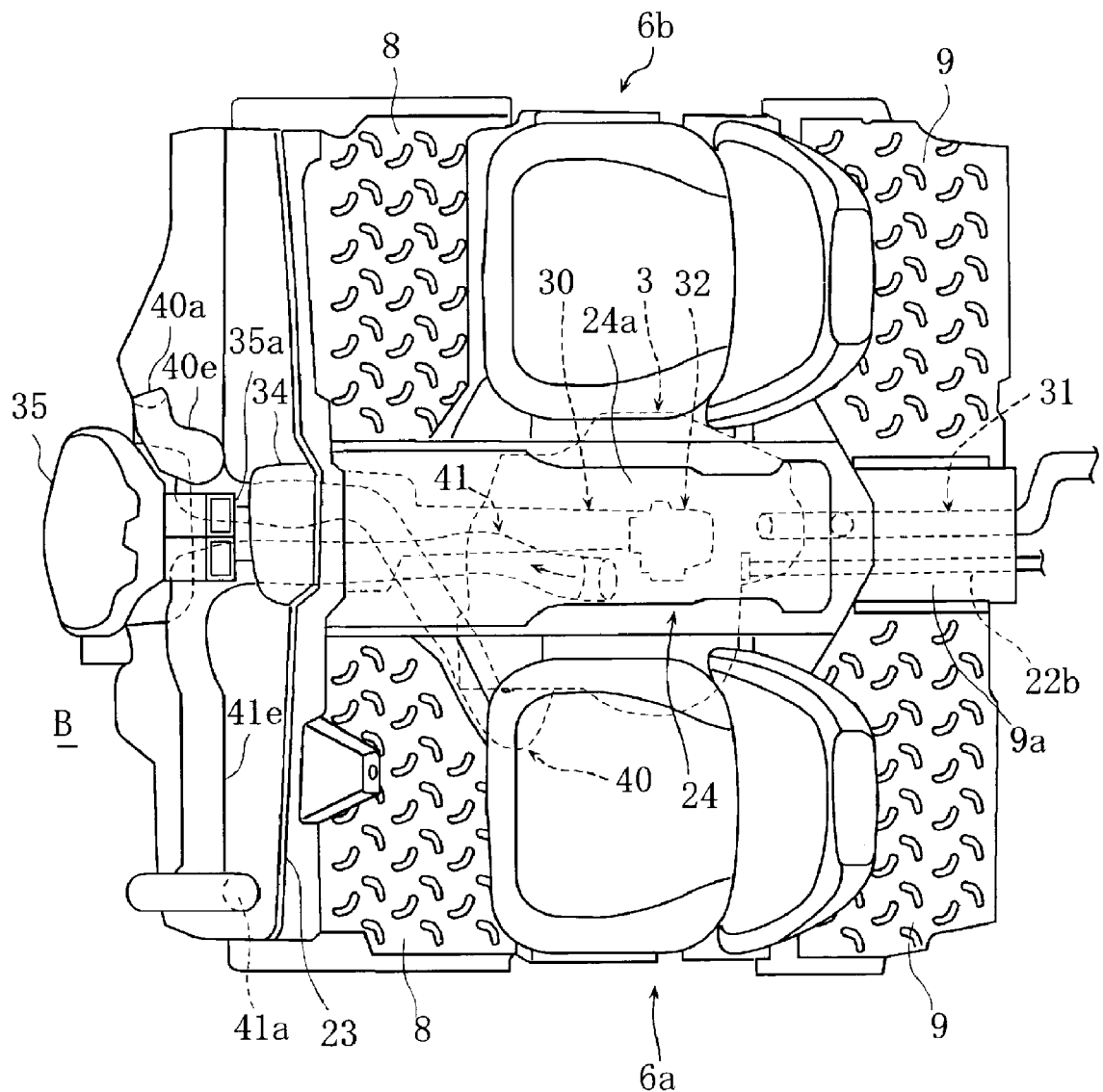
FIG. 9 is a plan view showing an arrangement state of a floor, a tunnel portion, an engine unit, and respective passages.

The front frame 2c, as shown in FIG. 6 and FIG. 8, has first and second cross frames 45 and 46, first and second center frames 47, and first and second side frames 48. The first cross frame 45 is arranged near the front end of the vehicle chamber A and above the main frame 2a, and extends in the width direction of the vehicle to connect the left and right pillar members 15, 15 to each other. The second cross frame 46 is arranged ahead of the first cross frame 45 to extend in the width direction of the vehicle. The first and second side frames 48 are arranged to extend in the front/rear direction of the vehicle at a left side portion and a right side portion in the width direction of the vehicle. The first and second center frames 47 extend in the front/rear direction of the vehicle inside the side frame in the width direction of the vehicle and connect the first cross frame 45 to the second cross frame 46. The front ends of the first and second center frames 47 are connected to the front end of the main frame 2a by left and right stays 47a.

The loading space frame 2e has stays 2f arranged upright near the rear end of the main frame 2a, side frames 2g supported by the stays 2f, and a plurality of cross frames 2h which connect the side frames 2g to each other.

A first seat 6 is mounted substantially on a center portion of the main frame 2a in the front/rear direction of the vehicle, and a second seat 7 is mounted on a front portion of the loading space frame 2e. A loading space 10 is arranged behind the second seat 7 of the loading space frame 2e. A first floor 8 is arranged on a forward portion of the first seat 6 of the main frame 2a.

The first seat 6 is configured by left and right seats 6a and 6b arranged with a predetermined gap in the width direction of the vehicle. The engine unit 3 is mounted between the left and right seats 6a and 6b.

Each of the left and right seats 6a and 6b has a seat cushion 6c and a seat back 6d, and a steering wheel 17 is arranged ahead of the left seat 6a.

The second seat 7 is arranged at a position substantially as high as the first seat 6, and has a bench seat cushion 7a and a seat back 7b for two passengers. A headrest 7c is arranged above the seat back 7b.

The vehicle 1 includes a partition wall 23 which is arranged behind the front wheels 4 in the front/rear direction of the vehicle to partition the vehicle 1 to form the vehicle chamber A and the front chamber B. The front chamber B is a space in front of the partition wall 23 and below a hood 25. The hood 25 is at least partially located ahead of the partition wall 23 in the front/rear direction of the vehicle, and is located above the front wheels 4. Left and right first floors (footrests) 8 for the passengers to place their feet are arranged between the partition wall 23 and the left and right seats 6a and 6b. Between the left and right first floors 8 in the width direction of the vehicle, a console 24 having an interior projects upward extending in the form of a tunnel substantially from the center portion of the partition wall 23 in the width direction of the vehicle to the rear side of the vehicle in the front/rear direction of the vehicle, and communicating with the front chamber B is arranged. An upper end 24a of the console 24 is arranged at a position slightly higher than a seat level of the first seat 6.

The partition wall 23 is arranged at a front end of the pillar frames 2b, and has an upper portion 23a on which gauges (not shown) such as a speedometer are arranged, an intermediate portion 23b extending diagonally forward from the upper portion 23a to the lower side, and a lower portion 23c extending diagonally backward from the intermediate portion 23b to the lower side. An accelerator pedal and a brake pedal (not shown) are arranged in the lower portion 23c. Front ends of the first floors 8 are connected to the rear end of the lower portion 23c.

The engine unit 3 is arranged in the interior space of console 24. The engine unit 3 includes a water-cooled four-cycle engine 20, a V-belt continuously variable transmission 21 which continuously varies a rotating speed of the engine 20, and a cooling unit 28 which cools the continuously variable transmission 21.

The engine 20 is obtained by stacking a cylinder body 20g and a cylinder head 20c on a crank case 20f and connecting the cylinder body 20g and the cylinder head 20c to each other. The continuously variable transmission 21 is connected to a side portion of the crank case 20f.

The engine 20 is arranged on a center portion of the left and right side members 12 in the front/rear direction of the vehicle and between the left and right seats 6a and 6b of the first seat 6. A crank shaft 20a of the engine 20 almost horizontally faces in the width direction of the vehicle, and a cylinder shaft line 20b faces diagonally backward and upward.

The engine 20 partially overlaps the first seat 6 when viewed from a side of the vehicle. More specifically, the cylinder head 20c of the engine 20 is arranged to overlap the seat cushion 6c.

Figure 4:
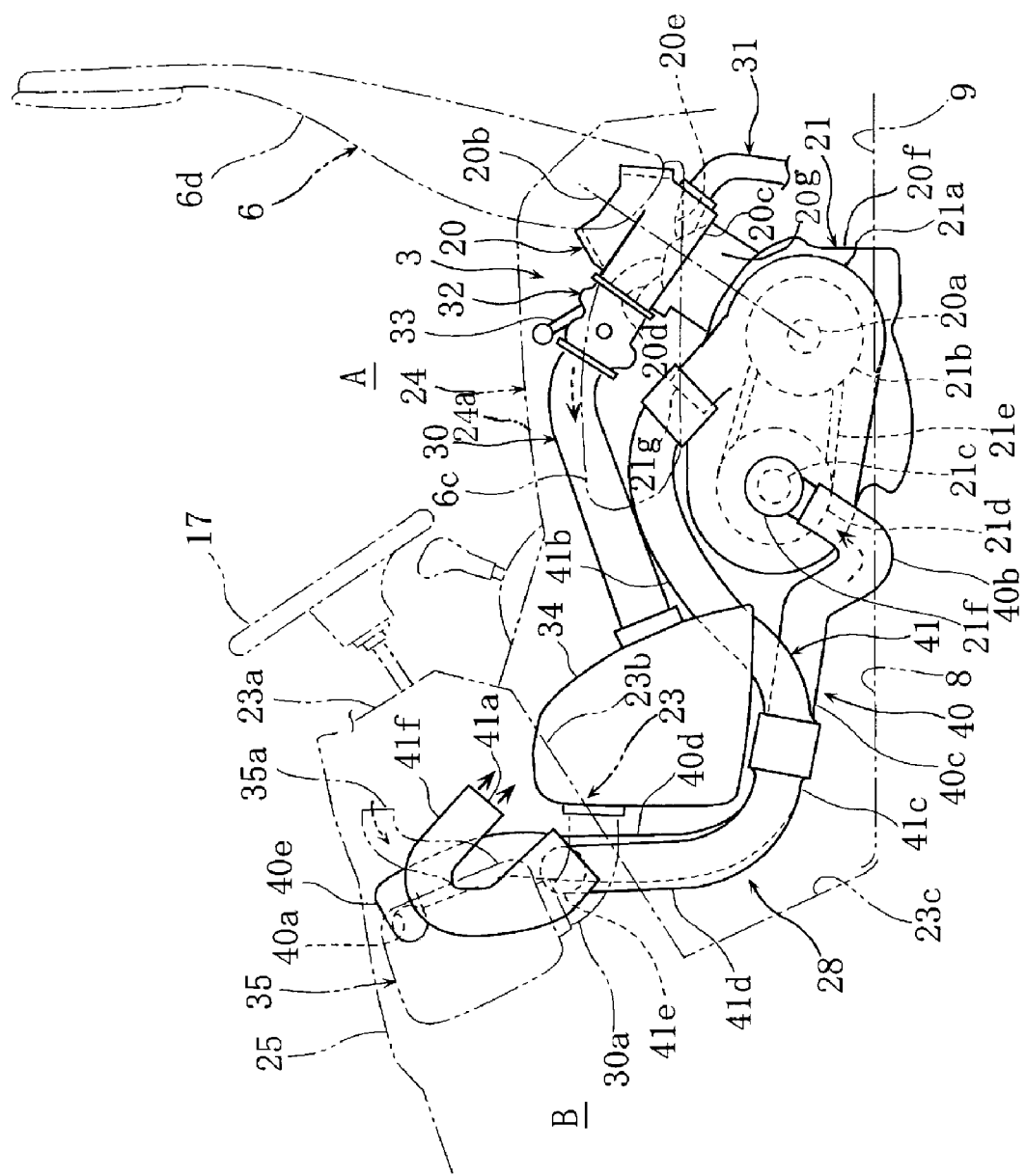
FIG. 4 is a side view of the engine unit.
Figure 5:
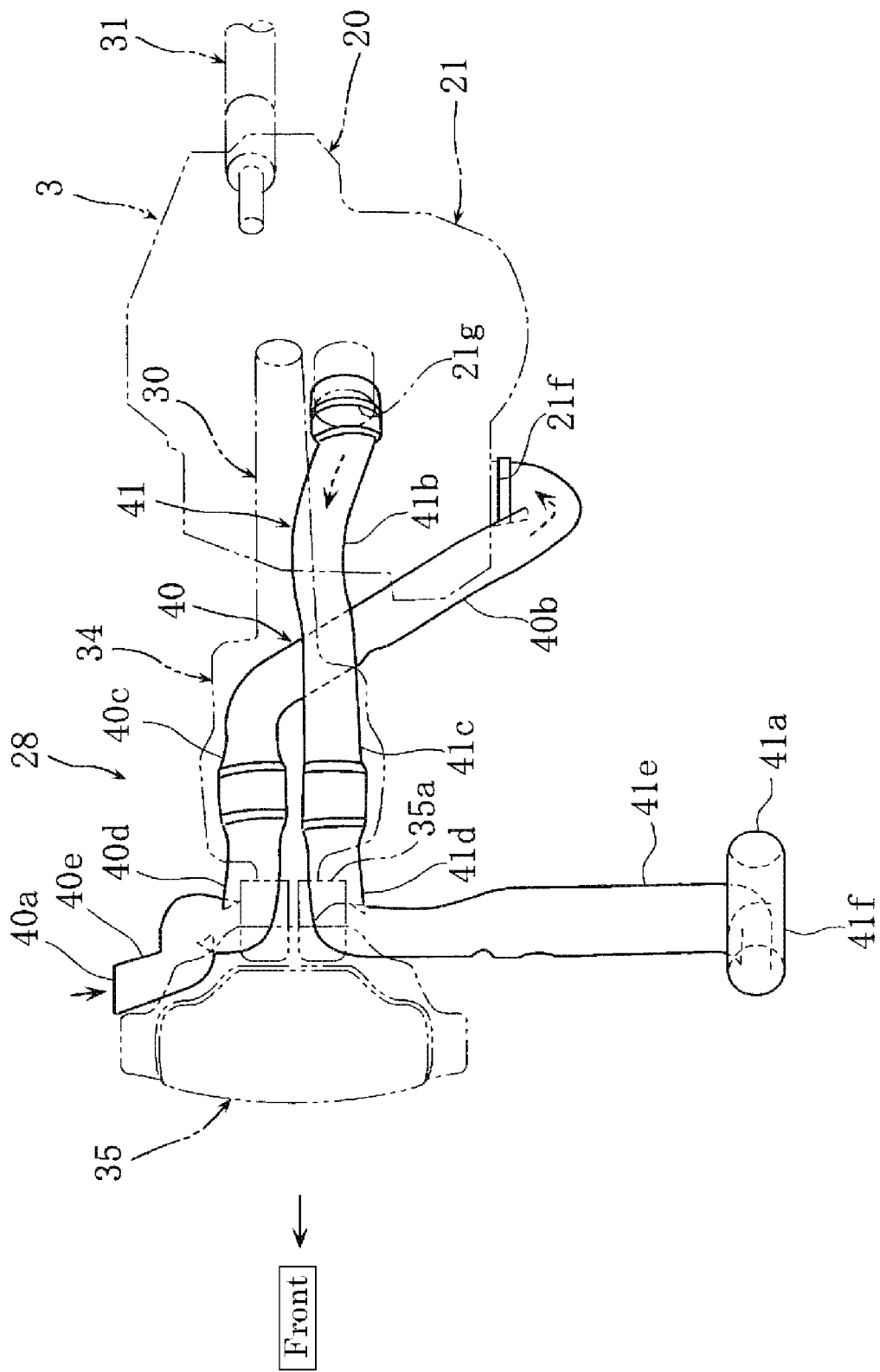
FIG. 5 is a plan view of the engine.

The engine 20 is mounted such that an intake port 20d opened on a front side wall of the cylinder head 20c faces the front side of the vehicle and an exhaust port 20e open on a rear side wall faces the rear side of the vehicle (see FIG. 4).

An intake pipe (intake passage) 30 is connected to the intake port 20d of the cylinder head 20c. The intake pipe 30 extends from the intake port 20d to the front side of the vehicle to supply combustion air into the engine 20. An exhaust pipe (exhaust passage) 31 is connected to the exhaust port 20e. The exhaust pipe 31 extends from the exhaust port 20e to the rear side of the vehicle to discharge exhaust gas to the rear side of the vehicle. The intake pipe 30 and the exhaust pipe 31 are almost linearly arranged substantially along a center line of the vehicle in the front/rear direction when viewed from the above.

The exhaust pipe 31 includes a first vertical pipe portion 31b almost vertically extending from a connection unit 31a connected to the cylinder head 20c to the lower side, a horizontal pipe portion 31c extending from a lower end of the first vertical pipe portion 31b to the rear side under a second floor 9, a second vertical pipe portion 31d extending upright from a rear end of the horizontal pipe portion 31c to the upper side, and an extending portion 31e extending from an upper end of the second vertical pipe portion 31d to the rear side of the vehicle between the second seat 7 and a rear wheel drive shaft 5a of the rear wheels 5.

The exhaust pipe 31 includes a muffler 36 connected to a rear end of the extending portion 31e and arranged in the rear of the second seat 7. The muffler 36 has an elliptic shape having a vertical dimension larger than a horizontal dimension, and arranged to have an axial line along the width direction of the vehicle.

The intake pipe 30 is connected to the cylinder head 20c through a throttle body 32 having a fuel injection valve 33.

In the middle of the intake pipe 30, a surge tank 34 is interposed. The surge tank 34 is arranged ahead of the engine 20 in the tunnel portion 24. An air cleaner 35 is connected to the surge tank 34 through an intake air supply pipe 30a. The surge tank 34 has a capacity larger than that of the air cleaner 35.

The air cleaner 35 is arranged at a center portion in the width direction of the vehicle and at a portion surrounded by the upper portion 23a and the intermediate portion 23b of the partition wall 23 and the hood 25 in the front chamber B in a side view.

The intake port 35a is connected and formed on a rear wall of the air cleaner 35. The intake port 35a is located at a position higher than an upper end 4b of the front wheel 4 and formed in a portion surrounded by the intermediate portion 23b of partition wall 23 and the hood 25, preferably facing rearward.

The continuously variable transmission 21 has a transmission case 21a connected to a left side of the engine 20 in the width direction of the vehicle and extending from the engine 20 to the front side, a drive pulley 21b housed in the transmission case 21a and attached to the crank shaft 20a of the engine 20, a driven pulley 21d attached to an output shaft 21c which is parallel to the crank shaft 20a, and a V-belt 21e wound on the drive pulley 21b and the driven pulley 21d.

A front power transmission shaft 22a extending forward and a rear power transmission shaft 22b extending backward are connected to the output shaft 21c. The front and rear power transmission shafts 22a, 22b are connected to the front and rear wheel drive shafts 4a and 5a through front and rear differential devices 22c, 22d, respectively.

The cooling unit 28 includes a cooling air supply duct (cooling air passage) 40 which supplies cooling air into the continuously variable transmission 21, and a cooling air exhaust duct (exhaust passage) 41 which discharges cooling air, and has a structure as described below in detail.

An air inlet port 21f is formed in a portion, facing the output shaft 21c, of a left outer side wall of the transmission case 21a. An air exhaust port 21g, facing the drive pulley 21b, is formed in a portion of an upper wall portion. The cooling air supply duct 40 is connected to the air inlet port 21f, and the cooling air exhaust duct 41 is connected to the air exhaust port 21g.

On a circumferential surface of the drive pulley 21b, a large number of fins (not shown) are formed in a circumferential direction. The drive pulley 21b rotates to take cooling air in the transmission case 21a.

The cooling air supply duct 40 has a first inlet portion 40b extending from the air inlet port 21f and curving to the inside in the width direction of the vehicle, a second inlet portion 40c extending from the first inlet portion 40b and passing through a portion below the surge tank 34, a third inlet portion 40d extending from the second inlet portion 40c to rise up on a front side of the surge tank 34, and a fourth inlet portion 40e extending from the third inlet portion 40d and curving to the right side in the width direction of the vehicle. An air inlet port 40a is formed in the fourth inlet portion 40e.

The air inlet port 40a is located at a position higher than the upper end 4b of the front wheel 4 and formed near a right side wall of the air cleaner 35 above the front chamber B in the width direction of the vehicle underneath hood 25.

Figure 7:
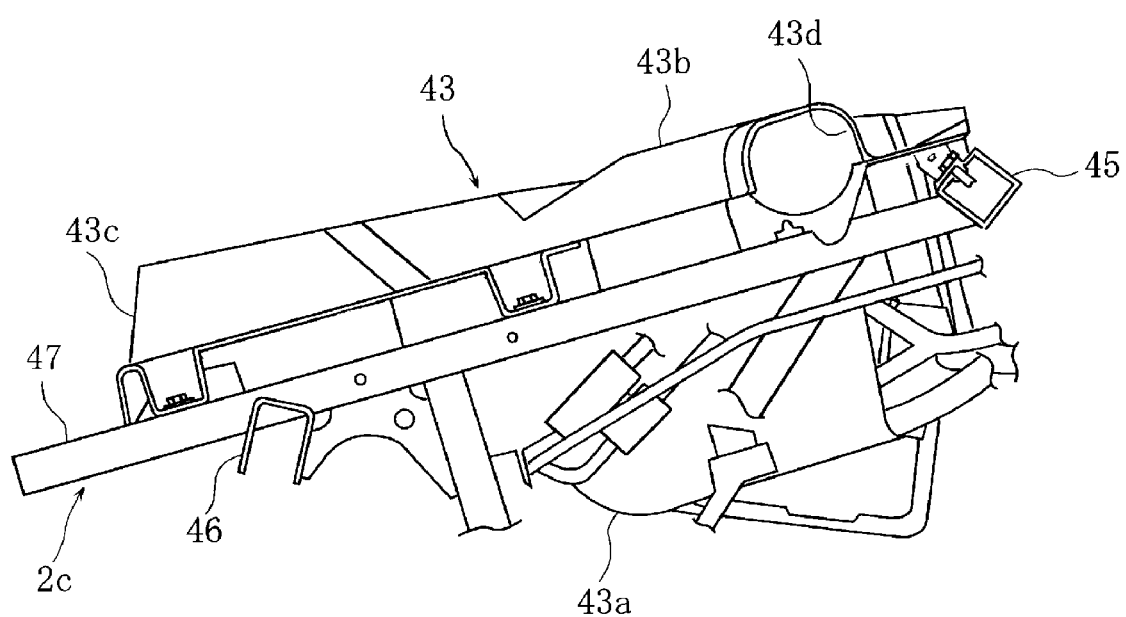
FIG. 7 is a side view of the housing box.

The air inlet port 40a, as shown in FIGS. 6 to 8, is connected to an air intake port 43d defined in a housing box 43 which houses in-vehicle parts attached to the front frame 2c, and has the following structure as described below in detail.

The housing box 43 is arranged at a portion surrounded by the first cross frame 45, the second cross frame 46, the second side frames 48, and the second center frame 47 of the front frame 2c. The housing box 43 has a housing box body 43a in which in-vehicle parts such as a battery 49 and various electronic parts 50 are housed, and a housing box cover 43b attached to the housing box body 43a to cover the upper side thereof.

An air inhalant port 43c is formed on a front end of the housing box cover 43b to open forward, and an air intake port 43d is formed in a rear end of an inner wall thereof. The air inlet 40a of the cooling air supply duct 40 is connected to the air intake port 43d. In this manner, air which has cooled the battery 49 and the electronic parts 50 is supplied into the transmission case 21a through the cooling air supply duct 40.

The cooling air exhaust duct 41 has a first exhaust portion 41b extending from the air exhaust port 21g to be diagonally forward and curved towards the lower side below the intake pipe 30, a second exhaust portion 41c extending from the first exhaust portion 41b below the surge tank 34 almost in parallel to the second inlet portion 40c, a third exhaust portion 41d extending from the second exhaust portion 41c to rise up on a front side of the surge tank 34 almost in parallel to the third inlet portion 40d, a fourth exhaust portion 41e extending from the third exhaust portion 41d to be curved to the left side in the width direction of the vehicle, and a fifth exhaust portion 41f extending from the fourth exhaust portion 41e and then diagonally backward extending to the lower side. An air outlet 41a is defined at the end of the fifth exhaust portion 41f directed downward and rearwardly.

The air outlet 41a is located at a position higher than the upper end 4b of the front wheel to open in the upper portion of the front chamber B downward and backward.

The intake pipe 30 and the surge tank 34 are arranged to be positioned above the cooling air supply duct 40 and the cooling air exhaust duct 41.

When viewed from the upper side of the vehicle, the intake pipe 30 partially overlaps the cooling air supply duct 40 and the cooling air exhaust duct 41, and the surge tank 34 partially overlaps the cooling air supply duct 40 and the cooling air exhaust duct 41. The intake pipe 30, the surge tank 34, the cooling air supply duct 40, and the cooling air exhaust duct 41 overlap the console 24 at the same time. More specifically, the intake pipe 30 overlaps the first exhaust portion 41b, and the surge tank 34 overlaps the second inlet portion 40c and the second exhaust portion 41c.

The intake port 35a of the air cleaner 35 vertically overlaps the third inlet portion 40d and the third exhaust portion 41d. The intake air supply pipe 30a is located between the third inlet portion 40d and the third exhaust portion 41d.

The air inlet port 40a and the air outlet 41a open in a portion above the front chamber B, the portion being surrounded by the upper portion 23a and the intermediate portion 23b of the partition wall 23 and the hood 25. The air inlet port 40a and the air outlet 41a are separately arranged on one side and the other side with reference to the center line of the vehicle in the width direction of the vehicle. More specifically, the air inlet port 40a and the air outlet 41a are spaced apart from each other with an interval which is ½ or more of the dimension in width of the vehicle.

According to the present embodiment, the air outlet 41a of the cooling air exhaust duct 41 which discharges air that has cooled the continuously variable transmission 21 is located ahead of the partition wall 23 and below the hood 25. For this reason, exhaust sound from the air outlet 41a is insulated by the partition wall 23 and the hood 25, and noise caused by exhaust can be inhibited from being transmitted to a passenger sitting in the vehicle chamber A.

Since the air outlet 41a is opened at a position higher than the upper end 4b of the front wheel, splashed water and splashed earth and sand caused by the front wheel 4 can be prevented from entering the air outlet 41a. More specifically, the all terrain vehicle 1 according to the present embodiment may be driven on a river, a marshy place, or earth road where the front wheels 4 and the rear wheels 5 are submerged. When the vehicle is driven on such an uneven ground, water, earth, and sand can be prevented from entering the air outlet 41a.

Since the air outlet 41a is opened downward and backward, rain water or water in car wash can be prevented from entering the air outlet 41a from the above while the splashed water and earth and sand can be prevented from entering the air outlet 41a.

In the present embodiment, since the air inlet port 40a of the cooling air supply duct 40 is opened in the upper portion of the front chamber B, suction noise from the air inlet port 40a is insulated by the partition wall 23 and the hood 25. For this reason, the suction noise can be inhibited from being transmitted to a passenger sitting in the vehicle chamber A.

Since the air inlet port 40a is opened at a position higher than the upper end 4b of the front wheel 4, splashed water and splashed earth and sand caused by the front wheels 4 can be prevented from entering the air outlet 41a.

In the present embodiment, since the air inlet port 40a is opened in the housing box 43 in which in-vehicle parts such as the battery 49 and the various electronic parts 50 are housed, the in-vehicle parts are cooled when cooling air passes through the inside of the housing box 43, cooling capability of the in-vehicle parts can be improved without providing an additional cooling structure.

In present the embodiment, since the air inlet port 40a and the air outlet 41a are separately arranged in the width direction of the vehicle, more specifically, since the air inlet port 40a and the air outlet 41a are arranged with an interval which is ½ or more of the dimension in width of the vehicle, high-temperature exhaust air can be reliably prevented from flowing into the air inlet port 40a. In this manner, low-temperature air can be supplied, and cooling efficiency can be improved.

In the present embodiment, since the intake port 35a of the air cleaner 35 to which the intake pipe 30 is connected is opened in the upper portion of the front chamber B in a side view, suction noise from the intake port 35a can be insulated as described above, and the suction noise can be inhibited from being transmitted to a passenger in the vehicle chamber A.

Since the intake port 35a is opened at a position higher than the upper end 4b of the front wheel 4, as described above, splashed water and splashed earth and sand caused by the front wheels 4 can be prevented from entering the intake port 35a.

In the present embodiment, since the engine unit 3 is arranged in the console 24 behind the partition wall 23, for example, heat effect on cooling air or combustion air occurring when an engine is arranged below a hood can be avoided, and low-temperature air can be supplied to the continuously variable transmission 21 and the engine 20.

In the present embodiment, the first seat 6 arranged on the front side of the vehicle and the second seat 7 arranged behind the first seat 6 are arranged, and the V-belt continuously variable transmission 21 is arranged below the first seat 6. For this reason, a seat level can be lowered, and a passenger space for a passenger sitting on the first seat can be secured.

When viewed from the side of the vehicle, the first seat 6 and the engine 20 are arranged to partially overlap. For this reason, in this regard, the level of the first seat 6 can be lowered, and a passenger space can be secured.

In the present embodiment, in a planar view, the intake pipe 30, the cooling air supply duct 40, and the cooling air exhaust duct 41 are arranged to partially overlap. As a result, the intake pipe 30 and each of the ducts 40, 41 vertically overlap and therefore a piping space for the intake pipe 30, the cooling air supply duct 40, and the cooling air exhaust duct 41 can be easily secured. Since the intake pipe 30 and the ducts 40 and 41 serving as noise sources are close to each other, a noise insulating structure such as a structure in which the ducts are covered with a cover can be simplified.

Since a portion of the intake pipe 30 arranged in the console 24 is arranged above portions of the cooling air supply duct 40 and the cooling air exhaust duct 41 in the passenger space, a piping space can be easily secured again as described above, and a sound insulating structure can be simplified.

Since the surge tank 34 interposed in the middle of the intake pipe 30 is arranged above the cooling air supply duct 40 and the cooling air exhaust duct 41, the surge tank 34 insulates noise from the cooling air supply duct 40 and the cooling air exhaust duct 41. A space for arranging the surge tank 34 having a relatively large capacity can be secured. The console (projecting unit) 24 projecting upward from the first floor 8 as well as extending from the center portion in the width direction of the vehicle to the rear side in the front/rear direction of the vehicle, and the intake pipe 30, the cooling air supply duct 40, and the cooling air exhaust duct 41 are arranged below the console 24 to overlap the console 24 in planar view. For this reason, the console 24 can inhibit suction noise, exhaust noise, and the like from being transmitted to a passenger.

Since the console 24 communicates with the front chamber B, the passages can be arranged to extend from the engine unit 3 to the front chamber B, and the console 24 can be easily used as an engine arrangement space.

What is claimed is:

1. A vehicle comprising:
   a body frame;
   a pair of left and right wheels and at least one pair of left and right rear wheels supported by the body frame;
   a partition wall arranged behind the front wheel;
   a passenger seat arranged behind the partition wall;
   an engine arranged behind the partition wall and mounted on the body frame;
   a belt-type continuously variable transmission which is coupled to the engine and varies the rotating speed of the engine to output power;
   a hood located at least in part ahead of the partition wall, and located above the front wheel;
   a cooling air passage that supplies cooling air into the continuously variable transmission; and
   an exhaust passage having an air outlet located ahead of at least part of the partition wall and below the hood that discharges the cooling air from the inside of the continuously variable transmission.

2. The vehicle according to claim 1, wherein an air outlet of the exhaust passage is opened at a position higher than the top of the front wheel.

3. The vehicle according to claim 2, further comprising:
   a footrest arranged between the partition wall and the seat, wherein
   the partition wall has an intermediate portion rising upwards from the footrest to the rear side of the vehicle, and
   the air outlet of the exhaust passage is arranged between the hood and the intermediate portion in the front/rear direction.

4. The vehicle according to claim 3, further comprising:
   an intake passage supplying combustion air into the engine, wherein
   air inlet ports of the cooling air passage and the intake passage are partially arranged between the hood and the intermediate portion in the front/rear direction.

5. The vehicle according to claim 2, wherein the air outlet of the exhaust passage is opened downward.

6. The vehicle according to claim 2, wherein the air outlet of the exhaust passage is opened downward and backward.

7. The vehicle according to claim 1, wherein an air inlet port of the cooling air passage is located ahead of at least a part of the partition wall and below the hood.

8. The vehicle according to claim 7, wherein the air inlet port of the cooling air passage is opened in a housing box for housing electrical components.

9. The vehicle according to claim 7, wherein the air inlet port of the cooling air passage is opened at a position higher than the top of the front wheel.

10. The vehicle according to claim 1, wherein
an air inlet port of the cooling air passage and an air outlet of the exhaust passage are arranged separately on opposing left or right sides of the vehicle with reference to the center line of the vehicle.

11. The vehicle according to claim 10, wherein
the air inlet port and the air outlet are separated by at least one half of the vehicle's width.

12. The vehicle according to claim 1, further comprising:
an intake passage supplying combustion air into the engine, wherein
an intake port of the intake passage is opened ahead of at least a part of the partition wall and below the hood.

13. The vehicle according to claim 12, wherein
the intake port of the intake passage is opened at a position higher than the top of the front wheel.

14. The vehicle according to claim 1, wherein
the passenger seat includes a first seat and a second seat arranged behind the first seat, and
the first seat is arranged above the belt-type continuously variable transmission.

15. The vehicle according to claim 14, wherein
a part of the first seat and a part of the engine are aligned in a horizontal plane.

16. The vehicle according to claim 1, further comprising:
a footrest arranged between the partition wall and the seat;
a projecting unit projecting upward from the footrest, extending from a center portion of the partition wall to the rear side, and communicating with a space ahead of the partition wall; and
an intake passage supplying combustion air into the engine, wherein
in a planar view, the intake passage, the cooling air passage, and the exhaust passage are arranged such that at least parts of the intake passage, the cooling air passage, and the exhaust passage overlap the projecting unit.

17. The vehicle according to claim 16, wherein
in a planar view, an overlapping portion between the intake passage and the projecting unit overlaps parts of the cooling air passage and the exhaust passage.

18. The vehicle according to claim 17, wherein
in a planar view, an overlapping portion between the intake passage and the projecting unit overlaps parts of the cooling air passage and the exhaust passage.

19. The vehicle according to claim 18, wherein
a surge tank is interposed in the middle of the intake passage, and
the surge tank is arranged above the cooling air passage and the exhaust passage.

20. A vehicle comprising:
a body frame;
a pair of left and right wheels and at least one pair of left and right rear wheels supported by the body frame;
a partition wall arranged behind the front wheel;
a console having an interior arranged rearwardly of the partition wall;
an engine disposed in the interior of the console and carried by the body frame;
a hood located at least in part ahead of the partition wall, and located above the front wheel;
a cooling air passage that supplies cooling air for the engine;
said cooling air passage including an intake passage having an air intake located ahead of at least part of the partition wall and below the hood;
an exhaust passage having an air outlet located ahead of at least part of the partition wall and below the hood; wherein
cooling air may be drawn from the intake passage for cooling the engine before being drawn through the exhaust passage and discharged below the hood.

21. The vehicle of claim 20 further comprising:
a housing for electrical components, mounted to the body frame ahead of the partition wall and below the hood, having an air intake and an air outlet,
said air outlet is in communication with said intake passage so that cooling air may be drawn from the air intake of the housing, through the housing, and then into said intake passage for subsequent delivery for cooling the engine.

22. The vehicle of claim 20, further comprising:
an air cleaner disposed ahead of the partition wall and below the hood;
said air cleaner has a secondary air intake, and
said secondary air intake is in communication with said intake passage, so that cooling air may be drawn from said secondary air intake and then into said intake passage.

23. The vehicle of claim 20, wherein said intake passage and exhaust passage are primarily located within said console.

24. The vehicle of claim 20 wherein said engine includes an air inlet port and an air exhaust port, said cooling air passage communicating with said air inlet port within said console and said exhaust passage communicates with said air exhaust port within said console.

25. The vehicle of claim 20, wherein said cooling air passage and said exhaust passage are located on opposite sides of the vehicle in the direction of vehicle width.

26. The vehicle of claim 20, wherein said air outlet of said exhaust passage faces said partition wall.

* * * * *

UNITED STATES PATENT AND TRADEMARK OFFICE
CERTIFICATE OF CORRECTION

Page 1 of 1

PATENT NO.       : 8,002,061 B2
APPLICATION NO.  : 12/362130
DATED            : August 23, 2011
INVENTOR(S)      : Takashi Yamamura et al.

It is certified that error appears in the above-identified patent and that said Letters Patent is hereby corrected as shown below:

On the Title Page:

Item (73) Assignee, should read: Yamaha Hatsudoki Kabushiki Kaisha, Shizuoka (JP)

Signed and Sealed this
Eighteenth Day of October, 2011

David J. Kappos
*Director of the United States Patent and Trademark Office*